United States Patent
Xu et al.

(10) Patent No.: US 11,003,957 B2
(45) Date of Patent: May 11, 2021

(54) METHOD AND APPARATUS FOR CERTIFICATE IDENTIFICATION

(71) Applicant: ADVANCED NEW TECHNOLOGIES CO., LTD., Grand Cayman (KY)

(72) Inventors: Wei Xu, Hangzhou (CN); Jidong Chen, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/878,587

(22) Filed: May 19, 2020

(65) Prior Publication Data

US 2020/0279138 A1    Sep. 3, 2020

Related U.S. Application Data

(63) Continuation of application No. PCT/CN2020/071567, filed on Jan. 11, 2020.

(30) Foreign Application Priority Data

Aug. 21, 2019 (CN) .......................... 201910773260.5

(51) Int. Cl.
  *G06K 9/62* (2006.01)
  *G06K 9/20* (2006.01)
  (Continued)

(52) U.S. Cl.
  CPC ....... *G06K 9/6262* (2013.01); *G06K 9/00382* (2013.01); *G06K 9/00744* (2013.01);
  (Continued)

(58) Field of Classification Search
  CPC ............... G06K 9/6262; G06K 9/3233; G06K 9/00744; G06K 9/00382; G06K 9/2081;
  (Continued)

(56) References Cited

U.S. PATENT DOCUMENTS 8,094,881 B2    1/2012 Matsugu et al.
8,406,484 B2    3/2013 Yoon et al.
(Continued)

FOREIGN PATENT DOCUMENTS

CN    102769760 A    11/2012
CN    105989263 A    10/2016
(Continued)

OTHER PUBLICATIONS

First Search dated May 8, 2020, issued in related Chinese Application No. 201910773260.5 (2 pages).
(Continued)

*Primary Examiner* — Jon Chang

(57) ABSTRACT

A method, a device, and a storage medium for certificate identification. The method may comprise: instructing a user to move a certificate according to a designated movement method within an imaging region of a camera of a terminal device; imaging the certificate in the imaging region to obtain a movement video of the certificate; extracting at least one key frame in the movement video; analyzing an image content of the at least one key frame according to a certificate identification method that corresponds to the designated movement method, to generate an analysis result of the image content; and determining, based on the analysis result, whether the certificate is a forged certificate.

20 Claims, 8 Drawing Sheets

(51) Int. Cl.
*G06K 9/00* (2006.01)
*G06K 9/32* (2006.01)

(52) U.S. Cl.
CPC ......... *G06K 9/2081* (2013.01); *G06K 9/3233* (2013.01); *G06K 2209/01* (2013.01)

(58) Field of Classification Search
CPC ............. G06K 2209/01; G06K 9/6293; G06K 9/4661; G06K 9/00442
See application file for complete search history.

(56) References Cited

U.S. PATENT DOCUMENTS

| | | | |
|---|---|---|---|
| 9,245,168 | B2 | 1/2016 | Suzuki et al. |
| 2007/0260886 | A1 | 11/2007 | Dufour |
| 2008/0212849 | A1 | 9/2008 | Gao |
| 2009/0198618 | A1 | 8/2009 | Chan et al. |
| 2019/0205686 | A1* | 7/2019 | Mayer ................ H04N 1/00244 |

FOREIGN PATENT DOCUMENTS

| | | |
|---|---|---|
| CN | 106599772 A | 4/2017 |
| CN | 106645409 A | 5/2017 |
| CN | 107944339 A | 4/2018 |
| CN | 109359502 A | 2/2019 |
| CN | 110070130 A | 7/2019 |
| EP | 2784723 B1 | 10/2016 |
| ES | 2331138 T3 | 12/2009 |
| JP | 2005-202653 A | 7/2005 |
| JP | 2005-202732 A | 7/2005 |
| JP | 2006-179023 A | 7/2006 |
| JP | 2007-516525 A | 6/2007 |
| JP | 3974375 B2 | 9/2007 |
| JP | 2011-078009 A | 4/2011 |
| KR | 10-2008-0065032 A | 7/2008 |
| KR | 10-0918286 B1 | 9/2009 |
| KR | 20110080327 A | 7/2011 |
| KR | 10-1626880 A | 6/2016 |
| WO | 2005-045770 A2 | 5/2005 |
| WO | 2013-114806 A1 | 8/2013 |

OTHER PUBLICATIONS

First Office Action dated May 12, 2020, issued in related Chinese Application No. 201910773260.5, with English machine translation (11 pages).

Supplemental Search dated Jun. 4, 2020, issued in related Chinese Application No. 201910773260.5 (1 page).

* cited by examiner

METHOD AND APPARATUS FOR CERTIFICATE IDENTIFICATION

CROSS-REFERENCE TO RELATED APPLICATIONS

This application is a continuation application of International Patent Application No. PCT/CN2020/071567, filed on Jan. 11, 2020, which is based on and claims priority to and benefit of Chinese Patent Application No. 201910773260.5, filed with China National Intellectual Property Administration (CNIPA) of People's Republic of China on Aug. 21, 2019. The entire disclosures of all of the above-identified applications are incorporated herein by reference.

TECHNICAL FIELD

The specification relates to the technical field of information verification, in particular to a method and apparatus for certificate identification.

BACKGROUND

Optical character recognition (OCR) of certificate characters is used extensively in identity verification scenarios, such as internet finance. OCR of certificate characters refers to processing, by the OCR technology, an image of a certificate provided by a user, in order to extract and identify the user information contained in the certificate, such as a user name, a date of birth, and an expiration date of the certificate. In a finance scenario, it is vitally important to identify any identity thefts or forgeries due to forged certificates. Behaviors of forging certificates by users in the black industry can be divided into two types, physical certificate forgery and electronic certificate forgery. Physical certificate forgery refers to alteration of certificate information directly on the physical entity of a certificate, including alteration of user identity information physically, for example, alteration of a name or date of birth by smearing, applying a physical patch, etc., direct fabrication of a certificate. Electronic certificate forgery refers to, forging information on the digitized image of the certificate obtained by digitization of a physical certificate by imaging, scanning, etc., for example, forging by Adobe Photoshop (PS) or any other image processing tool. Compared with physical certificate forgery, electronic certificate forgery has characteristics including easy access to forgery target since a certificate may be imaged directly without the need of a physical certificate, a low forgery cost, easy access to a forgery tool (i.e., Adobe Photoshop or any other image processing software), highly authentic, and prone to provoke batch attacks. Electronic services, such as internet finance, should focus on prevention from such forgeries.

SUMMARY

One or more embodiments in the specification provide a method and apparatus for certificate identification, to achieve an anti-forgery identification of electronic certificates that is universally applicable and has a high accuracy.

In order to solve the above-described technical problems, one or more embodiments in the specification are implemented as follows.

In a first aspect, one or more embodiments in the specification provide a method for certificate identification. The method may comprise: instructing a user to move a certificate according to a designated movement method within an imaging region of a camera of a terminal device; imaging the certificate in the imaging region to obtain a movement video of the certificate; extracting at least one key frame in the movement video; analyzing an image content of the at least one key frame according to a certificate identification method that corresponds to the designated movement method, to generate an analysis result of the image content; and determining, based on the analysis result, whether the certificate is a forged certificate.

In a second aspect, one or more embodiments in the specification provide a device for certificate identification. The device may comprise a processor and a memory configured to store computer-executable instructions executable by the processor to cause the processor to perform operations. The operations may include: instructing a user to move a certificate according to a designated movement method within an imaging region of a camera of a terminal device; imaging the certificate in the imaging region to obtain a movement video of the certificate; extracting at least one key frame in the movement video; analyzing an image content of the at least one key frame according to a certificate identification method that corresponds to the designated movement method, to generate an analysis result of the image content; and determining, based on the analysis result, whether the certificate is a forged certificate.

In a third aspect, one or more embodiments in the specification provide a non-transitory computer-readable storage medium storing computer-executable instructions executable by a processor to cause the processor to perform operations. The operations may include: instructing a user to move a certificate according to a designated movement method within an imaging region of a camera of a terminal device; imaging the certificate in the imaging region to obtain a movement video of the certificate; extracting at least one key frame in the movement video; analyzing an image content of the at least one key frame according to a certificate identification method that corresponds to the designated movement method, to generate an analysis result of the image content; and determining, based on the analysis result, whether the certificate is a forged certificate.

In technical solutions of embodiments in the specification, based on differences between a moving authentic certificate and a moving forged certificate, a forged certificate may be identified by a video of recording a moving certificate, for achieving a certificate identification that is easy-to-operate and highly accurate. In addition, the technical solutions are generally applicable to identify physical forged certificates and electronic forged certificates. Further, the technical solutions may be implemented in a hardware as simple as a mobile terminal having a camera without requiring specially designed hardware, and may be a very valuable universal application in certification identification scenarios, for example, e-commerce, Internet finance, and other identity verification scenarios.

BRIEF DESCRIPTION OF THE DRAWINGS

To illustrate the technical solutions according to one or more embodiments in the specification or in the prior art more clearly, the accompanying drawings for describing the embodiments or the prior art are briefly introduced below. Apparently, the accompanying drawings in the following description are only some embodiments described in one or more embodiments in the specification, and persons of ordinary skill in the art can derive other drawings from the accompanying drawings without creative efforts.

DETAILED DESCRIPTION OF EMBODIMENTS

One or more embodiments in the specification provide a method and apparatus for certificate identification, for achieving an anti-forgery identification of electronic certificates that is universally applicable and has a high accuracy.

In order to provide those of ordinary skill in the art a better understanding, the technical solutions in one or more embodiments in the specification will be described below clearly and completely with reference to the drawings in one or more embodiments in the specification. Obviously, the described embodiments are only some embodiments, but not all embodiments, of the specification. Any embodiments obtained by those of ordinary skill in the art based on one or more embodiments in the specification without making inventive efforts fall into the protection scope of the specification.

Figure 1:
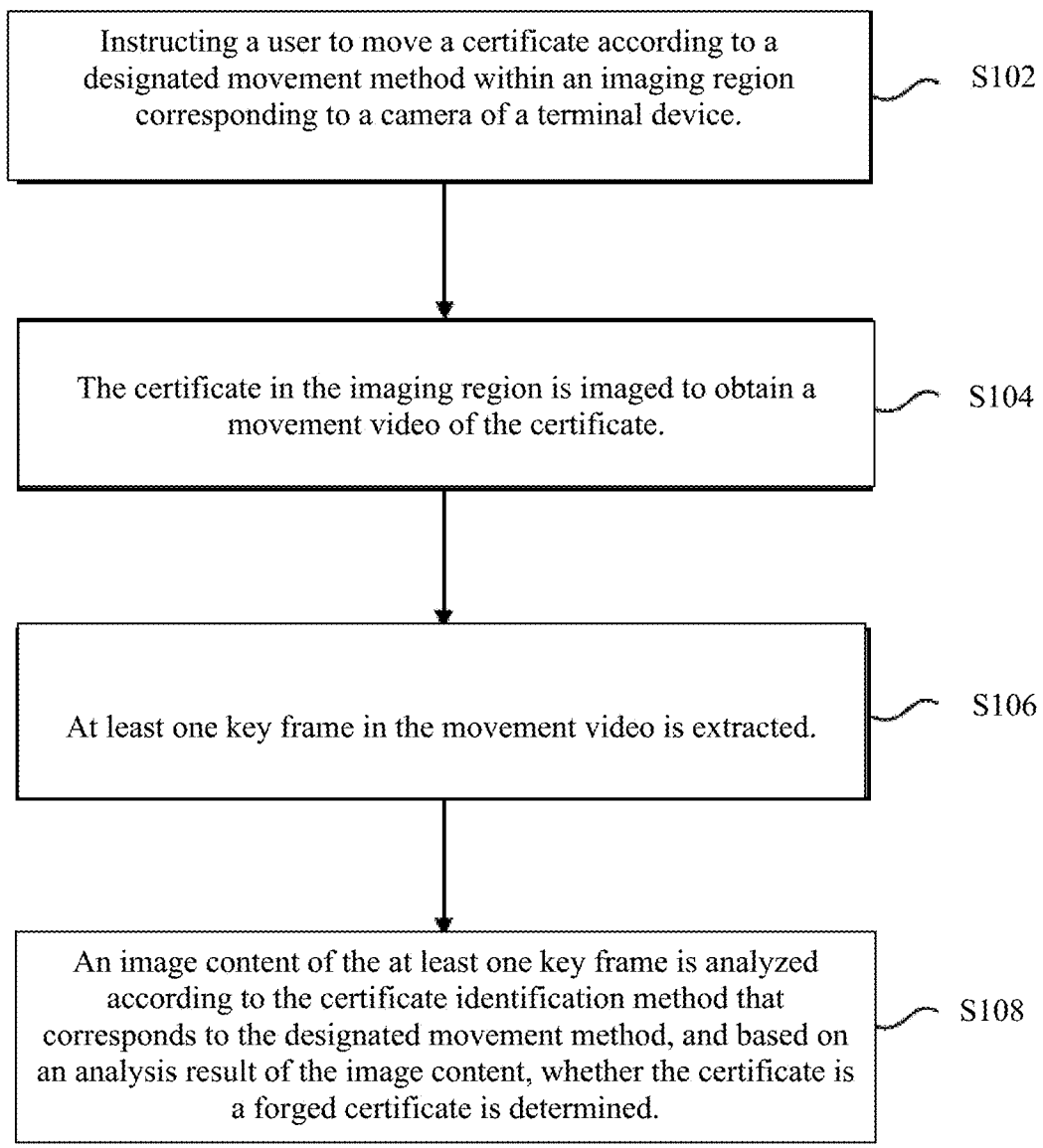
FIG. 1 is a flow chart of a method for certificate identification according to an embodiment in the specification.

FIG. 1 is a flow chart of a method for certificate identification according to an embodiment in the specification. As shown in FIG. 1, the method comprises the following operations.

In S102, instructing a user to move a certificate according to a designated movement method within an imaging region corresponding to a camera of a terminal device.

In the present embodiment, the designated movement method may be a shaking method, wherein the shaking method may comprise a front shaking method for moving the front of the certificate back and forth with respect to a camera, and a flank shaking method for moving the certificate side to side with respect to a camera. "Shaking" may mean swaying back and forth or up and down, for example, shaking an object repeatedly and quickly.

In S104, the certificate in the imaging region is imaged to obtain a movement video of the certificate.

The movement video of the certificate comprises a video of the certificate moving according to the designated movement method. In other words, in the movement video of the certificate, the certificate is moving instead of being motionless. If the designated movement method is the shaking method, in the movement video of the certificate, the certificate is shaken continuously.

In S106, at least one key frame in the movement video is extracted.

In this step, the at least one key frame extracted from the movement video has the characteristic of a high image resolution. Therefore, after the extraction of the at least one key frame, the image resolution of the at least one key frame may be detected. If the detection result shows that the image resolution of the at least one key frame is lower than a preset resolution, then the at least one key frame may be discarded. If the detection result shows that the image resolution of the at least one key frame is not lower than the preset resolution, then the at least one key frame may be retained and used as a basis for identifying the certificate in subsequent steps.

In the present embodiment, any image resolution detection algorithm, for example, an image histogram method, an energy variance method, or a Gaussian variance method, may be used to detect the image resolution of the at least one key frame. These methods are not described herein.

In S108, an image content of the at least one key frame is analyzed according to the certificate identification method that corresponds to the designated movement method, and based on an analysis result of the image content, whether the certificate is a forged certificate is determined.

In the present embodiment, the certificate identification method may be varied in accordance with the designated movement method of the certificate in the movement video. Specifically, adopting the certificate identification method corresponding to the designated movement method is described in detail in subsequent embodiments.

In technical solutions of embodiments in the specification, based on differences between a moving authentic certificate and a moving forged certificate, a forged certificate may be identified by a video of recording movement of a certificate, for achieving a certificate identification that is easy-to-operate and highly accurate. In addition, the technical solutions are generally applicable for identifying physical forged certificates and electronic forged certificates. Further, the technical solutions may be implemented in a hardware as simple as a mobile terminal having a camera without requiring specially designed hardware, and may be a very valuable universal application in certification identification scenarios, for example, e-commerce, Internet finance, and other identity verification scenarios.

A certificate identification method provided by the specification is explained below, with an example that the designated movement method is a shaking method and the certificate to be identified is a first certificate.

When the shaking method is a front shaking method, different certificate identification method may be adopted according to the imaging environment in which the camera images the first certificate. Specifically, if the imaging environment is a flash environment, then the certificate identification method may identify the first certificate by a trained first dichotomous classification algorithm. If the imaging environment is a non-flash environment, then the certificate identification method may identify the first certificate by a trained second dichotomous classification algorithm. How the certificate is identified in different imaging environments is described in detail below.

A flash environment may be an environment in which a mobile terminal captures an image with its flash on or may be an imaging environment created by a specialized imaging flashlight. In the present embodiment, for ease of an operation, the flash environment generally refers to an imaging environment created by a built-in flashlight of a mobile terminal.

When the movement video of the first certificate is imaged in a flash environment, a key frame extracted from the movement video is known as a bright frame. Thus, when the certificate is to be identified based on the extracted bright frame, an image content of the bright frame may first be classified by a trained first dichotomous classification algorithm to obtain a first classification result. Then, whether the first certificate is a forged certificate is determined based on the first classification result, wherein the first dichotomous classification algorithm is obtained by training based on light spot characteristics on a plurality of images of first forged certificate samples and a plurality of images of first non-forged certificate samples.

The first classification result may comprise a light spot characteristic in the key frame. Whether the first certificate is a forged certificate may be determined based on a light spot characteristic contained in the first classification result and light spot characteristics respectively corresponding to a forged certificate and a non-forged certificate.

Specifically, the first dichotomous classification algorithm may be obtained by training performed in Steps A1~A4.

In Step A1, the fronts of a plurality of first forged certificate samples are imaged in a flash environment to obtain a plurality of images of first forged certificate samples, and the fronts of a plurality of first non-forged certificate samples are imaged in a flash environment to obtain a plurality of images of first non-forged certificate samples.

The first forged certificate samples may include a variety of forged certificates, for example, a forged certificate that is obtained by a physical alteration of user identity information (for example, an alteration of a name or a date of birth by smearing, applying a physical patch, etc.) or direct fabrications, a physical forged certificate obtained by a color printout of a certificate, and an electronic forged certificate obtained by falsifying information on the electronic certificate photo obtained by digitization of a physical certificate via imaging, scanning, etc.

In Step A2, a first light spot in each of the images of first forged certificate samples and a second light spot in each of the images of first non-forged certificate samples are identified.

In Step A3, the characteristic of each first light spot is analyzed to obtain a first light spot characteristic of the images of first forged certificate samples, and each second light spot is analyzed to obtain a second light spot characteristic of the images of first non-forged certificate samples.

In Step A4, the first dichotomous classification algorithm is obtained by machine learning based on the first light spot characteristic and the second light spot characteristic.

Figure 2A:
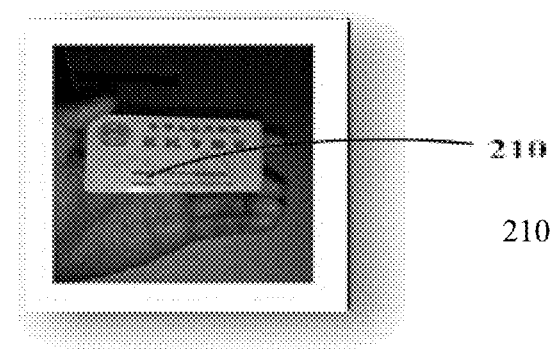
FIGS. 2(a)-2(b) show an image of a forged certificate and an image of a non-forged certificate that are taken in a flash environment in an embodiment in the specification.
Figure 2B:
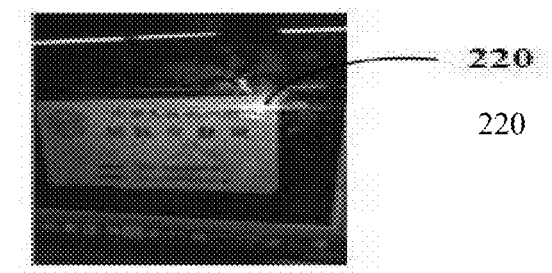

In the present embodiment, both an image of the forged certificate and an image of the non-forged certificate that are taken in a flash environment contain light spots, and the light spots are markedly different from each other. FIGS. 2(a)~2(b) respectively show, an image of the non-forged certificate and an image of the forged certificate that are taken in a flash environment, wherein FIG. 2(a) shows the image of the non-forged certificate taken in a flash environment and FIG. 2(b) shows the image of the forged certificate taken in a flash environment. As shown in the figures, the light spot 210 on the image of the non-forged certificate has the following characteristic (namely, the second light spot characteristic of the image of first the non-forged certificate sample): the light spot is nearly circular, has a smooth and even edge and low brightness, and pixels on the light spot focus towards the center, etc. The light spot 220 on the image of the forged certificate has the following characteristic (that is, the first light spot characteristic of the image of first the forged certificate sample): the light spot is radially shaped or star-shaped, has an irregular edge, is stretched in all directions (for example, up and down, or left and right), has a low brightness, etc. Therefore, the first dichotomous classification algorithm may be trained and obtained by machine learning the characteristic that distinguishes a light spot on an image of the forged certificate from a light spot on an image of the non-forged certificate.

A non-flash environment may be an environment in which an image is captured under a natural light.

When the movement video of a first certificate is imaged in a non-flash environment, a key frame extracted from the movement video is known as a dark frame. Then, when a certificate is to be identified based on the extracted dark frame, an image content of the dark frame may first be classified by a trained second dichotomous classification algorithm to obtain a second classification result. Then, whether the first certificate is a forged certificate is determined based on the second classification result, wherein the second dichotomous classification algorithm is obtained by training based on a screen moiré characteristic and/or a certificate rim characteristic on a plurality of images of second forged certificate samples and a plurality of images of second non-forged certificate samples.

The second classification result may contain a screen moiré characteristic and/or a certificate rim characteristic corresponding to a key frame. Whether the first certificate is a forged certificate may be determined based on the screen moiré characteristic and/or the certificate rim characteristic contained in the second classification result, as well as a screen moiré characteristic and/or a certificate rim characteristic respectively corresponding to a forged certificate and a non-forged certificate.

Specifically, a second dichotomous classification algorithm may be obtained by training performed in Steps B1~B3:

In Step B1, the fronts of a plurality of second forged certificate samples are imaged in a non-flash environment to obtain a plurality of images of second sample forged certificate samples, and the fronts of a plurality of second non-forged certificate samples are imaged in a non-flash environment to obtain a plurality of images of second non-forged certificate samples.

The second forged certificate samples may include a variety of forged certificates, for example, a forged certificate that is obtained by a physical alteration of user identity information (for example, an alteration of a name or a date of birth by smearing, applying a physical patch, etc.) or direct fabrications, a physical forged certificate obtained by a color printout of a certificate, and an electronic forged certificate obtained by falsifying information on the electronic certificate photo obtained by digitization of a physical certificate via imaging, scanning, etc.

In Step B2, characteristics of information of each image of second forged certificate sample is analyzed to obtain a first image characteristic of the images of second forged certificate samples, and characteristics of each image of second non-forged certificate sample is analyzed to obtain a second image characteristic of the images of second non-forged certificate samples, wherein the information comprises screen moiré information and/or certificate rim information.

In Step B3, a second dichotomous classification algorithm is obtained by machine learning based on the first image characteristic and the second image characteristic.

In the present embodiment, the screen moiré information and certificate rim information respectively corresponding to an image of the forged certificate and an image of the non-forged certificate captured in a non-flash environment may be different. Specifically, if the forged certificate is an electronic forged certificate obtained by falsifying information on the electronic certificate photo obtained by digitization of a physical certificate via imaging, scanning, etc., since the electronic forged certificate is generally shown on a computer screen or mobile phone screen, the image of the forged certificate obtained by imaging has a screen moiré, while the image of the non-forged certificate has no screen moiré. Alternatively, since the electronic forged certificate is generally shown on a computer screen or mobile phone screen, the rim of the image of the forged certificate obtained by imaging is the rim of the computer screen or the rim of the mobile phone screen, while the rim of the image of the non-forged certificate may be the background environment in which the certificate is located or the human hand holding the certificate, but not the rim of a computer screen or mobile phone screen.

Figure 3A:
FIGS. 3(a)-3(b) show an image of a forged certificate and an image of a non-forged certificate that are taken in a non-flash environment in an embodiment in the specification.
Figure 3B:

FIGS. 3(a)~3(b) respectively show, an image of the forged non-forged certificate and an image of the forged certificate that are taken in a non-flash environment, wherein FIG. 3(a) shows the image of the non-forged certificate taken in a non-flash environment and FIG. 3(b) shows the image of the forged certificate taken in a non-flash environment. As shown in the figures, the image of the non-forged certificate contains no screen moirés, and the rim thereof is the background environment in which the certificate is located and the human hand holding the certificate. The image of the forged certificate contains screen moirés, and the rim thereof is the rim of the terminal device.

Therefore, the second dichotomous classification algorithm may be trained and obtained by machine learning whether an image of the forged certificate and an image of the non-forged certificate contain a screen moiré and/or a characteristic of the certificate rim. In the present embodiment, how to identify the screen moiré and the characteristics of the certificate rim on an image certificate is not be described herein.

When the shaking method is a front shaking method, an image region of a key frame in which a human hand moves a first certificate may be identified by a first image segmentation algorithm. Then, based on the image region, a posture in which the human hand holds the first certificate may be determined. Based on the posture in which the human hand holds the first certificate, whether the first certificate is a forged certificate may be determined. The first image segmentation algorithm may be any image segmentation algorithm capable of identifying the image region having a human hand and the certificate in an image content of a key frame.

Since a forged certificate (i.e., an electronic forged certificate in the present embodiment) is generally shown on a computer screen or mobile phone screen, a posture in which a human hand holds a forged certificate, is the posture in which a human hand holds a computer or mobile phone. For a non-forged certificate, a posture in which the human hand holds the certificate is the posture in which a human hand holds a certificate having a fixed size and a fixed shape.

In the present embodiment, at least one posture in which a human hand holds a non-forged certificate may be preset, and the information of the preset posture in which a human hand holds a non-forged certificate may be stored on a network (for example, in a certificate certification device). When a certificate is to be identified, the posture in which a human hand holds the certificate in the key frame may be determined first. Then, the information of the determined posture may be compared with the information of the pre-stored posture in which a human hand holds a non-forged certificate on the network. If a match is found (i.e., the determined posture is the preset posture in which a human hand holds a non-forged certificate), then it is determined that the certificate is not a forged certificate. Otherwise (i.e., the determined posture is not the preset posture in which a human hand holds a non-forged certificate), then it is determined that the certificate is a forged certificate.

Certainly, at least one posture in which a human hand holds a forged certificate may further be preset, and information of the preset posture in which a human hand holds a forged certificate may be stored on the network (for example, in a certificate certification device). When a certificate is to be identified, the posture in which a human hand holds the certificate in the key frame may be determined first. Then, the information of the determined posture may be compared with the information of the pre-stored posture in which a human hand holds a forged certificate on the network. If a match is found (i.e., the determined posture is the preset posture in which a human hand holds a forged certificate), then it is determined that the certificate is a forged certificate. Otherwise (i.e., the determined posture is not the preset posture in which a human hand holds a forged certificate), then it is determined that the certificate is not a forged certificate.

In addition, at least one posture in which a human hand holds a non-forged certificate and at least one posture in which a human hand holds a forged certificate may be preset at the same time, and the information of the preset posture in which a human hand holds a non-forged certificate and the information of the preset posture in which a human hand holds a forged certificate may be stored on the network (for example, in a certificate certification device). When a certificate is to be identified, the posture in which a human hand holds the certificate in the key frame may be determined first. Then, the information of the determined posture may be compared with the information of the pre-stored postures on the network, and whether the information of the determined posture matches the information of the preset posture in which a human hand holds a forged certificate or matches the information of the preset posture in which a human hand holds a non-forged certificate is determined. Based on a determination result, whether the certificate is a forged certificate is determined.

Figure 4A:
FIGS. 4(a)-4(b) respectively show postures in which an image of a non-forged certificate and an image of a forged certificate are held by a human hand in an embodiment in the specification.
Figure 4B:

FIGS. 4(a)~4(b) respectively show the postures in which an image of the non-forged certificate and an image of the forged certificate are held by a human hand. FIG. 4(a) shows the posture in which the image of the non-forged certificate is held by a human hand, and FIG. 4(b) shows the posture in which the image of the forged certificate is held by a human hand. As shown in the figures, if the user holds a forged certificate in the posture shown in FIG. 4(a), then it is difficult for the user to hold the forged certificate stably or to shake it.

Therefore, in the present embodiment, whether a certificate is a forged certificate is determined by determining the posture in which a human hand holds the certificate, resulting in a simple and easy to operate identification method for identifying a forged certificate.

When the shaking method is a front shaking method, certificate shaking information in an image content of the at least one key frame may be analyzed, wherein the certificate shaking information may include a certificate shaking frequency, a certificate shaking speed, etc. Then, based on the certificate shaking information, whether the first certificate is a forged certificate is determined.

In the present embodiment, since a forged certificate (i.e., an electronic forged certificate) is generally shown on a computer screen or mobile phone screen, and the computer or mobile phone is heavier than a non-forged certificate, the frequency and speed at which the forged certificate is shaken by a human hand are lower. Therefore, a shaking frequency threshold and/or a shaking speed threshold may be preset, and the shaking frequency threshold and/or shaking speed threshold may be pre-stored on the network (for example, in a certificate certification device). When a certificate is to be identified, the certificate shaking frequency and/or the certificate shaking speed in the recorded movement video may be determined first. Then, the determined certificate shaking frequency is compared with the shaking frequency threshold pre-stored on the network, and/or the determined certificate shaking speed is compared with the shaking speed threshold pre-stored on the network. If the certificate shaking frequency is lower than the shaking frequency threshold, and/or the certificate shaking speed is lower than the shaking speed threshold, it is determined that the certificate is a forged certificate. If the certificate shaking frequency is not lower than the shaking frequency threshold, and/or the certificate shaking speed is not lower than the shaking speed threshold, it is determined that the certificate is not a forged certificate.

In the present embodiment, whether the certificate is a forged certificate is determined by determining the information of shaking the certificate by a human hand, resulting in a simple and easy to operate identification method for identifying a forged certificate.

Before the image content of the at least one key frame is analyzed, each angular point and/or rim line of the first certificate in the key frame may be identified first. Then, based on each angular point and/or rim line of the first certificate, whether a front posture of the first certificate in the key frame matches a preset standard front posture of a certificate is determined. If the front posture of the first certificate in the key frame does not match the preset standard front posture of a certificate, the front posture of the first certificate in the key frame is adjusted to the standard front posture of a certificate. If the front posture of the first certificate in the key frame matches the preset standard front posture of a certificate, the image content of the at least one key frame may be analyzed.

The angular points of the first certificate may refer to the vertexes of a quadrilateral corresponding to the first certificate. The preset standard front posture of a certificate may include a posture in which the rim lines are parallel to or perpendicular to a horizontal line. If the front posture of the first certificate does not match the preset standard front posture of a certificate, then the certificate posture in the key frame may be adjusted by a posture correction algorithm. An adjustment method may comprise, first, based on the difference between the front posture of the first certificate and the preset standard front posture of a certificate, determine a transition matrix for adjusting a certificate region to the standard front posture of a certificate, and then adjust the front posture of the first certificate according to the transition matrix.

In the present embodiment, by adjusting the front posture of the first certificate to the standard front posture of a certificate according to the transition matrix in advance, when the first certificate is identified subsequently, the front posture of the first certificate matches the standard front posture of a certificate, resulting in a more accurate identification result.

When the shaking method is a flank shaking method, the certificate region in the key frame may first be identified by a second image segmentation algorithm. Then, the position of each pixel in the certificate region is fit by a parabolic fitting algorithm to obtain certificate flank curves. Then, a curvature of a certificate flank curve may be determined, and whether the curvature of the certificate flank curve is within a preset range may be determined. If the curvature of the certificate flank curve is not within the preset range, it is determined that the first certificate is a forged certificate. The second image segmentation algorithm may be any image segmentation algorithm capable of identifying a certificate region in an image content of a key frame. The position of each pixel in the certificate region may be fit by any parabolic fitting algorithm to obtain the certificate flank curves.

The plurality of key frames may be extracted from the movement video. When the first certificate is to be identified, whether curvatures of the certificate flank curves in each key frame are within the preset range may be determined. If the curvature of at least one certificate flank curve exceeds the present range, it is determined that the first certificate is a forged certificate.

Figure 5A:
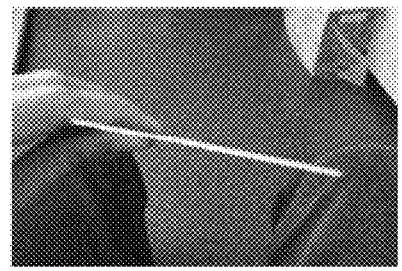
FIGS. 5(a)-5(c) respectively show images of a forged certificate and a non-forged certificate in a flank shaking method in an embodiment in the specification.
Figure 5B:
Figure 5C:
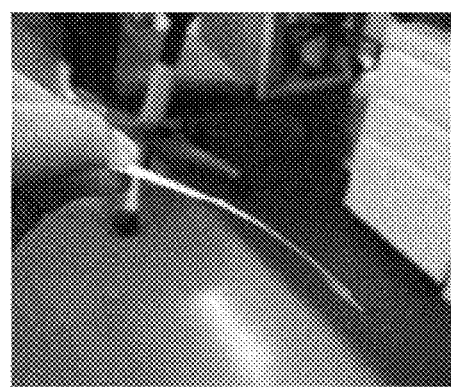

FIGS. 5(a)-5(c) respectively show images of a non-forged certificate and a forged certificate moving according to the flank sharking method. FIG. 5(a) shows a shape of a non-forged certificate moving according to the flank shaking method, FIG. 5(b) shows a shape of an electronic forged certificate moving according to the flank shaking method, and FIG. 5(c) shows a shape of a physical forged certificate (a color printout of a certificate) moving according to the flank shaking method. As shown in the figures, since an electronic forged certificate is generally shown on a computer screen or mobile phone screen, no curvature is generated when it is moving. In contrast, a physical forged certificate, such as a paper printout, may be moved to a greater extent than an authentic certificate, in other words, a greater curvature of the curve is generated. Therefore, whether the first certificate is a forged certificate may be determined based on a flank shaking curvature of the moving first certificate. If the curvature is larger than the maximum value of the preset range, it may be determined that the first certificate is a physical forged certificate. If the curvature is smaller than the minimum value of the preset range, then it may be determined that the first certificate is an electronic forged certificate.

In the present embodiment, whether a certificate is a forged certificate is determined based on the flank shaking curvature of the moving certificate, resulting in a simple and easy to operate identification method for identifying a forged certificate including electronic forged certificates and physical forged certificates.

After extraction of a key frame in a movement video, whether the image content of the key frame contains a human hand may be determined. If a human hand is contained in the image content, the image content of the at least one key frame according to the certificate identification method that corresponds to the designated movement method is further analyzed. If a human hand is not contained in the image content, it may be directly determined that the first certificate is a forged certificate.

If a forged certificate (i.e., an electronic forged certificate in the present embodiment) is stored in a computer, since a computer cannot be shaken by a human hand, the false impression of moving the certificate may be achieved by moving a mobile terminal. Therefore, the certificate may be identified by determining the certificate or the mobile terminal is actually shaken by a human hand.

First, gyroscopic data of the terminal device may be obtained. Then, device shaking information of the mobile terminal may be determined based on the gyroscopic data, wherein the device shaking information includes a device shaking frequency and a device shaking speed. If the device shaking information meets a preset condition, then the image content of the at least one key frame according to the certificate identification method that corresponds to the designated movement method may further be analyzed, wherein the preset condition includes that the device shaking frequency is smaller than a preset frequency value and that the device shaking speed is smaller than a preset speed value.

A plurality of methods for identification of a certificate have been described above in detail. In an actual application, in order to increase the accuracy of the identification, a certificate may be identified by a combination of a plurality of methods. How a certificate is identified by the combination of the plurality of methods is described below. Certainly, the combination of the plurality of methods in the following embodiment is only one combination and the sequence of performing each method is not limited.

Figure 6:
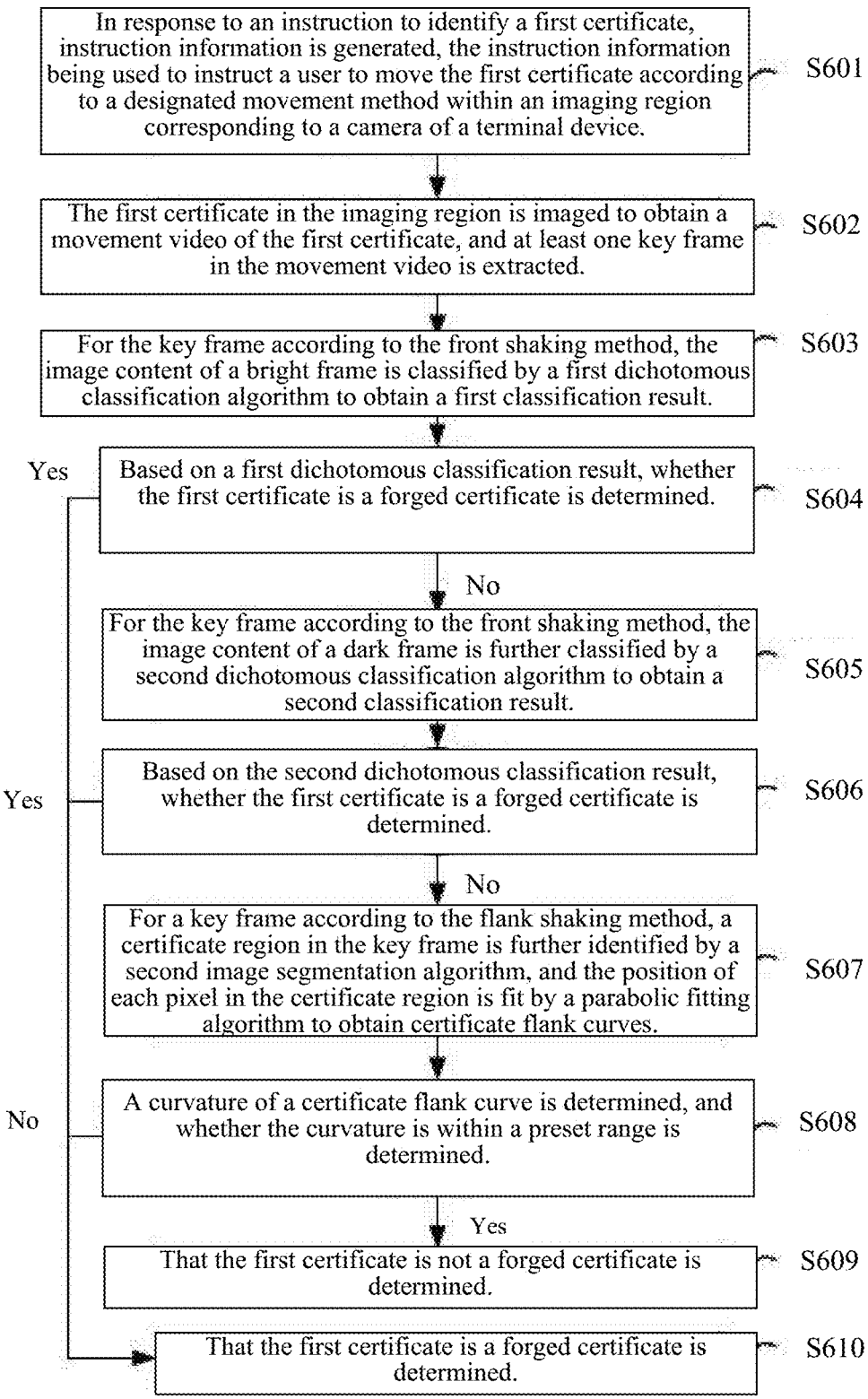
FIG. 6 is a flow chart of a method for certificate identification according to a specific embodiment in the specification.

FIG. 6 is a flow chart of a method for certificate identification according to an embodiment in the specification. In the present embodiment, the designated movement method is a shaking method, and the certificate to be identified is a first certificate. As shown in FIG. 6, the method comprises the following.

In S601, in response to an instruction to identify a first certificate, instruction information is generated, the instruction information being used to instruct a user to move the first certificate according to a designated movement method within an imaging region corresponding to a camera of a terminal device.

In the present embodiment, a shaking method comprises a front shaking method and a flank shaking method.

In S602, the first certificate in the imaging region is imaged to obtain a movement video of the first certificate, and extract at least one key frame in the movement video.

In the present embodiment, the first certificate is imaged in a flash environment and a non-flash environment, respectively.

Since a shaking method in the present embodiment comprises a front shaking method and a flank shaking method, the extracted at least one key frame may contain, at the same time, a key frame of according to the front shaking method and a key frame according to the flank shaking method. In order to increase the accuracy of the certificate identification, a plurality of bright frames and a plurality of dark frames may be extracted respectively, and the bright frames and dark frames may be identified by different algorithms respectively.

In the present embodiment, a bright frame and a dark frame may be differentiated by determining whether a key frame contains a flashlight spot. If a key frame contains a flashlight spot, then it may be determined that the key frame is a bright frame. If a key frame contains no flashlight spot, then it may be determined that the key frame is a dark frame.

In S603, for the key frame according to the front shaking method, the image content of a bright frame is classified by a first dichotomous classification algorithm to obtain a first classification result.

The first dichotomous classification algorithm is obtained by training based on a light spot characteristic on a plurality of images of forged certificate samples and a plurality of images of non-forged certificate samples. The process of training the first dichotomous classification algorithm is explained in detail in the above-described embodiment and will not be described again.

In S604, based on a first dichotomous classification result, whether the first certificate is a forged certificate is determined. If the first certificate is not determined as a forged certificate, proceed to S605. If the first certificate is determined as a forged certificate, proceed to S610.

The first classification result may comprise a light spot characteristic in a key frame. Whether the first certificate is a forged certificate may be determined based on the light spot characteristic contained in the first classification result and the light spot characteristics respectively corresponding to a forged certificate and a non-forged certificate.

In S605, for the key frame according to the front shaking method, the image content of a dark frame is further classified by a second dichotomous classification algorithm to obtain a second classification result.

The second dichotomous classification algorithm is obtained by training based on a screen moiré characteristic and/or a certificate rim characteristic on a plurality of images of forged certificate samples and a plurality of images of non-forged certificate samples. The process of training the second dichotomous classification algorithm is explained in detail in the above-described embodiment and will not be described again.

In S606, based on the second dichotomous classification result, whether the first certificate is a forged certificate is determined. If the first certificate is not determined as a forged certificate, proceed to S607. If the first certificate is determined as a forged certificate, proceed to S610.

The second classification result may comprise a screen moiré characteristic and/or a certificate rim characteristic corresponding to the key frame. Whether the first certificate is a forged certificate may be determined based on the screen moiré characteristic and/or the certificate rim characteristic contained in the second classification result, as well as a screen moiré characteristic and/or a certificate rim characteristic respectively corresponding to a forged certificate and a non-forged certificate.

In S607, for a key frame according to the flank shaking method, a certificate region in the key frame is further identified by a second image segmentation algorithm, and the position of each pixel in the certificate region is fit by a parabolic fitting algorithm to obtain certificate flank curves.

The second image segmentation algorithm may be any image segmentation algorithm capable of identifying a certificate region in an image content of a key frame. The position of each pixel in the certificate region may be fit by any parabolic fitting algorithm to obtain certificate flank curves.

In S608, a curvature of a certificate flank curve is determined, and whether the curvature is within a preset range is determined. If the curvature is determined to be within the preset range, proceed to S609. If the curvature is determined not to be within the preset range, proceed to S610.

In this step, since an electronic forged certificate is generally shown on a computer screen or mobile phone screen, no curvature is generated when it is moving. In contrast, a physical forged certificate, such as a paper printout, may be shaken to a greater extent than an authentic certificate, in other words, a greater curvature of the curve is generated in the process of shaking. Therefore, whether the first certificate is a forged certificate may be determined based on a flank shaking curvature when moving the first certificate.

If the curvature is greater than the maximum value of the preset range, it may be determined that the first certificate is a physical forged certificate. If the curvature is smaller than the minimum value of the preset range, it may be determined that the first certificate is an electronic forged certificate.

In S609, that the first certificate is not a forged certificate is determined.

In S610, that the first certificate is a forged certificate is determined.

In the present embodiment, a video of a moving certificate is recorded, and key frames of the video are sequentially identified by a combination of a plurality of certificate identification methods, including the identification of a bright frame and a dark frame corresponding to a front shaking method, and the identification of a curvature of a curve generated in a flank shaking method. Not only the electronic forged certificates but also the physical forged certificates may be identified, thereby greatly increasing the accuracy and general applicability of the certificate identification.

To summarize, some embodiments of the present invention are described above. Other embodiments fall within the scope defined by the attached claims. In certain cases, the actions described in the claims may be performed in a different sequence and the desired result may still be achieved. Further, the processes illustrated in the drawings do not require a specific sequence or a continuous sequence in order to achieve the desired result. In certain embodiments, multitasking and parallel processing may be favorable.

A method for certificate identification provided in one or more embodiments in the specification has been described above. Based on the same idea, one or more embodiments in the specification further provide a certificate identification apparatus.

Figure 7:
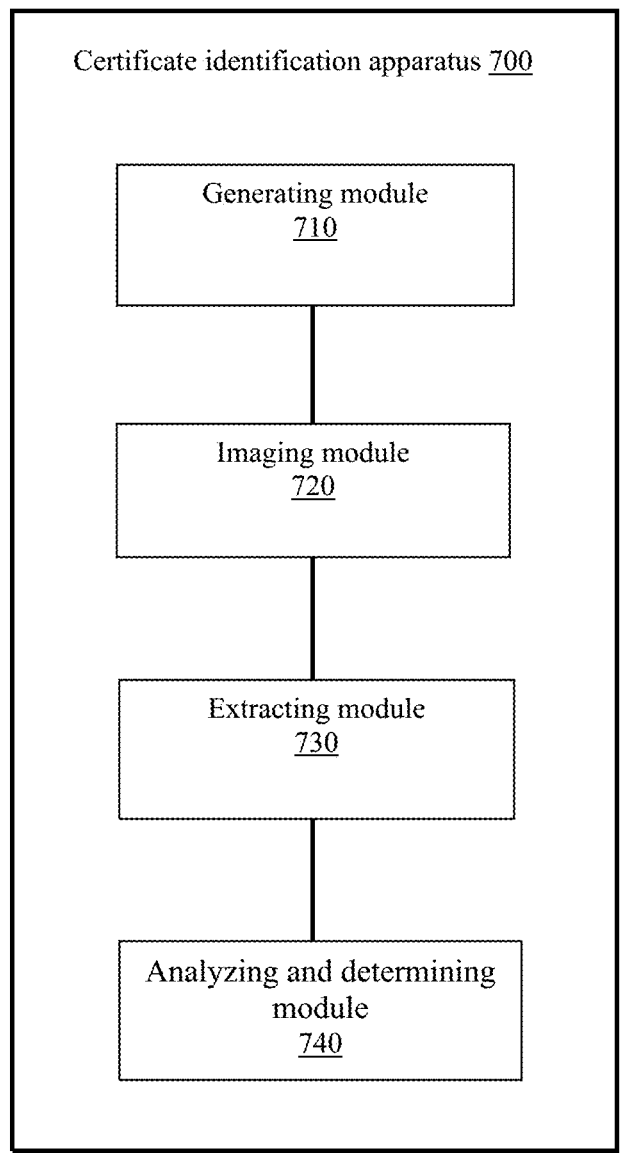
FIG. 7 is a schematic block diagram of an apparatus for certificate identification according to an embodiment in the specification.

FIG. 7 is a schematic block diagram of an apparatus for certificate identification according to an embodiment in the specification. As shown in FIG. 7, a certificate identification apparatus 700 comprises: a generating module 710, instructing a user to move a certificate according to a designated movement method within an imaging region corresponding to a camera of a terminal device; an imaging module 720, imaging the certificate in the imaging region to obtain a movement video of the certificate; an extracting module 730, extracting at least one key frame in the movement video; and an analyzing and determining module 740, analyzing an image content of the at least one key frame according to a certificate identification method that corresponds to the designated movement method, and determining, based on an analysis result, whether the certificate is a forged certificate.

Further, the designated movement method may be a shaking method; and the shaking method comprises: a front shaking method for moving the front of a certificate back and forth with respect to the camera, and/or a flank shaking method for moving a flank of a certificate side to side with respect to the camera.

Further, the shaking method is a front shaking method; and the analyzing and determining module 740 comprises: a first classifying and determining unit, if the key frame is a bright frame imaged in a flash environment, classifying an image content of the bright frame by a trained first dichotomous classification algorithm to obtain a first classification result, and determining whether the certificate is a forged certificate based on the first classification result, wherein the first dichotomous classification algorithm is obtained by training based on a light spot characteristic on a plurality of images of the first forged certificate samples and a plurality of images of the first non-forged certificate samples; and a second classifying and determining unit, if the key frame is a dark frame imaged in a non-flash environment, classifying an image content of the dark frame by a trained second dichotomous classification algorithm to obtain a second classification result, and determining whether the certificate is a forged certificate based on the second classification result, wherein the second dichotomous classification algorithm is obtained by training based on a screen moiré characteristic and/or a certificate rim characteristic on a plurality of images of the second forged certificate samples and a plurality of images of the second non-forged certificate samples.

Further, the apparatus 700 comprises a first training module for training a first dichotomous classification algorithm; and the first training module comprises: a first imaging unit, imaging the fronts of a plurality of first forged certificate samples in a flash environment to obtain a plurality of images of the first forged certificate samples, and imaging the fronts of a plurality of first non-forged certificate samples in a flash environment to obtain a plurality of images of the first non-forged certificate samples; a first identifying unit, identifying a first light spot in each of the images of the first sample forged certificates, and identifying a second light spot in each of the images of the first non-forged certificate samples; a first analyzing unit, analyzing the characteristic of each first light spot to obtain a first light spot characteristic of the images of the first forged certificate samples, and each second light spot to obtain a first light spot characteristic of the images of the first forged certificate samples and a second light spot characteristic of the images of the first non-forged certificate samples; and a first learning unit, obtaining a first dichotomous classification algorithm by machine learning based on the first light spot characteristic and the second light spot characteristic.

Further, the apparatus 700 comprises a second training module for training a second dichotomous classification algorithm; and the second training module comprises: a second imaging unit, imaging the fronts of a plurality of second forged certificate samples in a non-flash environment to obtain a plurality of images of second forged certificate samples, and image the fronts of a plurality of second non-forged certificate samples in a non-flash environment to obtain a plurality of images of second non-forged certificate samples; a second analyzing unit, analyzing the characteristic of information of each image of the second forged certificate sample to obtain a first image characteristic of the images of second forged certificate samples, and analyzing the characteristic of information of each image of the second non-forged certificate sample to obtain a second image characteristic of the images of second the non-forged certificate samples, wherein the information comprises screen moiré information and/or certificate rim information; and a second learning unit, obtaining the first dichotomous classification algorithm by machine learning based on the first image characteristic and the second image characteristic.

Further, the analyzing and determining module 740 comprises: a second identifying unit, identifying, by a first image segmentation algorithm, an image region in a key frame and in which a human hand moves the certificate; a posture determining unit, based on the image region in which the human hand is located, determining a posture in which the human hand holds the certificate; and a first determining unit, based on the posture, determining whether the certificate is a forged certificate.

Further, the analyzing and determining module 740 comprises: a third analyzing unit, analyzing certificate shaking information in the image content of the at least one key frame, the certificate shaking information comprising at least one of a certificate shaking frequency and a certificate shaking speed; and a second determining unit, based on the certificate shaking information, determining whether the certificate is a forged certificate.

Further, the apparatus 700 comprises: an identifying module, before the image content of the at least one key frame is analyzed according to the certificate identification method corresponding to the designated movement method, identifying each angular point and/or rim line of the certificate in the key frame; a determining module, based on each angular point and/or rim line of the certificate, determining whether a front posture of the certificate in the key frame matches a preset standard front posture of a certificate; and an adjusting module, if the front posture of the certificate in the key frame does not match the preset standard front posture of a certificate, adjusting the front posture of the certificate in the key frame to the standard front posture of a certificate.

Further, when the shaking method is a flank shaking method, the analyzing and determining module 740 comprises: a third identifying unit, identifying a certificate region in a key frame by a second image segmentation algorithm; a fitting unit, fitting the position of each pixel in the certificate region by a parabolic fitting algorithm to obtain a certificate flank curve; a third determining unit, determining a curvature of the certificate flank curve, and determining whether the curvature of the certificate flank curve is within a preset range; and a second determining unit, if the curvature of the certificate flank curve is not within the present range, determining that the certificate is a forged certificate.

Further, when a plurality of the key frames are included, the third determining unit, determining whether the curvature of each certificate flank curve is within the preset range; and the second determining unit, if a curvature of at least one certificate flank curve is not within the present range, determining that the certificate is a forged certificate.

Further, the analyzing and determining module 740 comprises: a fourth determining unit, determining whether the image content of the at least one key frame contains a human hand; and a fourth analyzing unit, if the image content of the at least one key frame contains a human hand, analyzing the image content of the at least one key frame according to the certificate identification method that corresponds to the designated movement method.

Further, the analyzing and determining module 740 comprises: an obtaining unit, obtaining gyroscopic data of a terminal device; a fifth determining unit, determining device movement information of the mobile terminal based on the gyroscopic data, wherein the device movement information comprises at least one of a device movement frequency and a device movement speed; and a fifth analyzing unit, if the device movement information meets a preset condition, analyzing the image content of the at least one key frame according to the certificate identification method that corresponds to the designated movement method, wherein the preset condition comprises at least one of that the device movement frequency is smaller than a preset frequency value and that the device movement speed is smaller than a preset speed value.

With an apparatus of an embodiment in the specification, based on differences between a moving authentic certificate and a moving forged certificate, a forged certificate may be identified by a video of recording a moving certificate, for achieving a certificate identification that is easy-to-operate and highly accurate. In addition, the technical solutions are generally applicable to identify physical forged certificates and electronic forged certificates. Further, the technical solutions may be implemented in a hardware as simple as a mobile terminal having a camera without requiring specially designed hardware, and may be a very valuable universal application in certification identification scenarios, for example, e-commerce, Internet finance, and other identity verification scenarios.

Those of ordinary skill in the art may understand that the above-described apparatus may be used to implement the above certificate identification method. Since a detailed description of the apparatus is similar to the corresponding description of the above method, similar description will not be repeated herein.

Figure 8:
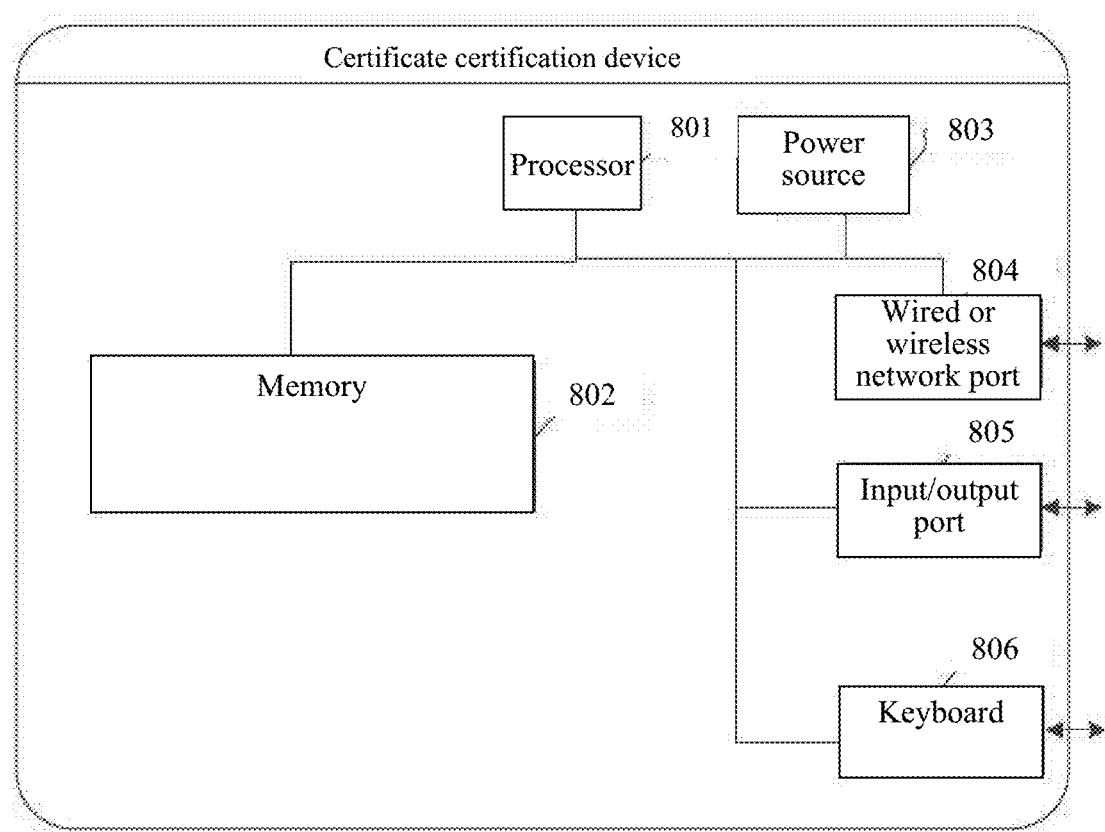
FIG. 8 is a schematic block diagram of a device for certificate identification according to an embodiment in the specification.

Based on the same idea, one or more embodiments in the specification further provide a certificate identification device, as shown in FIG. 8. Certificate identification devices may be varied greatly with configurations or performances. A certificate identification device may comprise one or more processors 801 and a memory 802. The memory 802 may store one or more application programs or pieces of data. The memory 802 may comprise a transient storage or a permanent storage. An application program stored in the memory 802 may comprise one or more modules (not shown in the figure), and each module may comprise a series of computer-executable instructions for the certificate identification device. Further, the processor 801 may be configured to communicate with the memory 802 and execute the series of computer-executable instructions stored in the memory 802 on the certificate identification device. The certificate identification device may further comprise one or more power sources 803, one or more wired or wireless network ports 804, one or more input/output ports 805, and one or more keyboards 806.

In the present embodiment, the certificate identification device comprises a memory and one or more programs, wherein the one or more programs are stored in the memory. The one or more programs may comprise one or more modules. Each module may comprise a series of computer-executable instructions on the certificate identification device, and be configured for execution of the one or more programs by the one or more processors, including execution of the following computer-executable instructions: instructing a user to move a certificate according to a designated movement method within a imaging region corresponding to a camera of a terminal device; imaging the certificate in the imaging region to obtain a movement video of the certificate; extracting at least one key frame in the movement video; and analyzing an image content of the at least one key frame according to the certificate identification method that corresponds to the designated movement method, and determining, based on an analysis result, whether the certificate is a forged certificate.

Further, the designated movement method is a shaking method; and the shaking method comprises: a front shaking method for moving the front of the certificate back and forth with respect to the camera, and/or a flank shaking method for moving a flank of the certificate side to side with respect to the camera.

Further, when the shaking method is the front shaking method, the computer-executable instruction, when executed, further causes the processor to: if the key frame is a bright frame imaged in a flash environment, then classify an image content of the bright frame by a trained first dichotomous classification algorithm to obtain a first classification result, and determine, based on the first classification result, whether the certificate is a forged certificate, wherein the first dichotomous classification algorithm is obtained by training based on a light spot characteristic on a plurality of images of the first forged certificate samples and a plurality of images of the first non-forged certificate samples; and if the key frame is a dark frame imaged in a non-flash environment, then classify an image content of the dark frame by a trained second dichotomous classification algorithm to obtain a second classification result, and determine, based on the second classification result, whether the certificate is a forged certificate, wherein the second dichotomous classification algorithm is obtained by training based on a screen moiré characteristic and/or a certificate rim characteristic on a plurality of images of the second forged certificate samples and a plurality of images of the second non-forged certificate samples.

Further, the computer-executable instruction, when executed, causes the processor to: image the fronts of a plurality of first forged certificate samples in a flash environment to obtain a plurality of images of the first forged certificate samples, and image the fronts of a plurality of first non-forged certificate samples in a flash environment to obtain a plurality of images of the first non-forged certificate samples; identify a first light spot in each of the images of the first forged certificate samples, and identify a second light spot in each of images of the first non-forged certificate samples; analyze the characteristic of each first light spot to obtain a first light spot characteristic of images of the first forged certificate samples, and analyze the characteristic of each second light spot to obtain a second light spot characteristic of images of the first non-forged certificate samples; and obtain the first dichotomous classification algorithm by machine learning based on the first light spot characteristic and the second light spot characteristic.

Further, the computer-executable instruction, when executed, causes the processor to: image the fronts of a plurality of second forged certificate samples in a non-flash environment to obtain a plurality of images of the second forged certificate samples, and image the fronts of a plurality of second non-forged certificate samples in a non-flash environment to obtain a plurality of images of the second non-forged certificate samples; analyze the characteristic of information of images of the second forged certificate samples to obtain a first image characteristic of images of the second forged certificate samples, and analyze the characteristic of information of images of the second non-forged certificate samples to obtain and a second image characteristic of images of the second non-forged certificate samples, wherein the information comprises screen moiré information and/or certificate rim information; and obtain the first dichotomous classification algorithm by machine learning based on the first image characteristic and the second image characteristic.

Further, the computer-executable instruction, when executed, causes the processor to: identify, by a first image segmentation algorithm, an image region that is in the key frame and in which a human hand moves the certificate; based on the image region in which the human hand is located, determine a posture in which the human hand holds the certificate; and based on the posture, determine whether the certificate is a forged certificate.

Further, the computer-executable instruction, when executed, causes the processor to: analyze certificate shaking information in an image content of the at least one key frame, the certificate shaking information comprising at least one of a certificate shaking frequency and a certificate shaking speed; and based on the certificate shaking information, determine whether the certificate is a forged certificate.

Further, the computer-executable instruction, when executed, causes the processor to: before analyzing an image content of the at least one key frame according to the certificate identification method corresponding to the designated movement method, identify each angular point and/or rim line of the certificate in the key frame; based on each angular point and/or rim line of the certificate, determine whether a front posture of the certificate in the key frame matches a preset standard front posture of a certificate; and if the front posture of the certificate in the key frame does not match the preset standard front posture of a certificate, adjust the front posture of the certificate in the key frame to the standard front posture of a certificate.

Further, when the shaking method is the flank shaking method, the computer-executable instruction, when executed, causes the processor to: identify a certificate region in the key frame by a second image segmentation algorithm; fit the position of each pixel in the certificate region by a parabolic fitting algorithm to obtain certificate flank curves; determine a curvature of a certificate flank curve, and determine whether the curvature of the certificate flank curve is within a preset range; and if the curvature of the certificate flank curve is determined not within the preset range, determine that the certificate is a forged certificate.

Further, when a plurality of the key frames are included, the computer-executable instruction, when executed, further causes the processor to: determine whether the curvature of each certificate flank curve is within the preset range, and if a curvature of at least one certificate flank curve is not within the present range, determine that the certificate is a forged certificate.

Further, the computer-executable instruction, when executed, causes the processor to: determine whether the image content of the at least one key frame contains a human hand; and if the image content of the at least one key frame contains a human hand, further analyze the image content of the at least one key frame according to the certificate identification method that corresponds to the designated movement method.

Further, the computer-executable instruction, when executed, causes the processor to: obtain gyroscopic data of the terminal device; determine device movement information of the mobile terminal based on the gyroscopic data, wherein the device movement information comprises at least one of a device movement frequency and a device movement speed; and if the device movement information meets a preset condition, further analyze the image content of the at least one key frame according to the certificate identification method that corresponds to the designated movement method, wherein the preset condition comprises at least one of that the device movement frequency is smaller than a preset frequency value and that the device movement speed is smaller than a preset speed value.

One or more embodiments in the specification further provide a computer-readable storage medium. The computer-readable storage medium stores one or more programs, and the one or more programs comprise instructions. The instructions comprising a plurality of application programs, when executed by an electronic device, cause the electronic device to execute the above-described certificate identification method, and is used to: instructing a user to move a certificate according to a designated movement method within a imaging region corresponding to a camera of a terminal device; image the certificate in the imaging region to obtain a movement video of the certificate; extract at least one key frame in the movement video; and analyze an image content of the at least one key frame according to the certificate identification method that corresponds to the designated movement method, and determine, based on an analysis result, whether the certificate is a forged certificate.

The system, apparatus, module, or unit explained in the above-described embodiments may be implemented by a computer chip or entity, or may be implemented by a product that has certain functions. A typical implementation device comprises a computer. Specifically, for example, the computer may be a personal computer, a laptop computer, a cellular phone, a camera phone, a smartphone, a personal digital assistant, a media player, a navigation device, an e-mail device, a game console, a tablet PC, a wearable device, or a combination thereof.

For convenience of description, the above apparatus is divided into different units by functions, which are described separately. Certainly, in the implementation of one or more embodiments in the specification, the functions of each unit may be implemented by the same piece or a plurality of pieces of software and/or hardware.

Those of ordinary skill in the art should understand that one or more embodiments in the specification may be provided as a method, a system, or a computer program product. Therefore, one or more embodiments in the specification may be in the form of a whole hardware embodiment, a whole software embodiment, or combination of software and hardware. In addition, one or more embodiments in the specification may be in the form of a computer program product designed for implementation on one or more computer-usable storage media (including, but not limited to, disk memories, CD-ROMs, and optical memories) that comprise computer-usable program codes.

One or more embodiments in the specification are described with reference to the flow charts and/or block diagrams for the methods, devices (systems), and computer program products of the embodiments in the specification. It should be understood that each flow and/or block in the flow charts and/or block diagrams, and a combination of the flows and/or blocks in the flow charts and/or block diagrams may be implemented by computer program instructions. These computer program instructions may be provided to a processor in a general computer, a special computer, an embedded processor, or any other programmable data processing device to generate a machine, so that, by an instruction executed by a processor in a computer or any other programmable data processing device, an apparatus may be generated and used to implement the functions designated in one or more flows in a flow chart and/or one or more blocks in a block diagram.

These computer program instructions may also be stored in a computer-readable memory that may lead a computer or any other programmable data processing device to work in a specific manner, so that, by instructions stored in the computer-readable memory, a product comprising an instruction device may be generated. The instruction device implements the functions designated in one or more flows in a flow chart and/or one or more blocks in a block diagram.

These computer program instructions may also be loaded into a computer or any other programmable data processing device, so that a series of operating steps are executed on a computer or any other programmable data processing device for the computer to generate processes. Thus, by an instruction executed by a computer or any other programmable data processing device, steps are provided and performed to implement the functions designated in one or more flows in a flow chart and/or one or more blocks in a block diagram.

In a typical configuration, a computer device comprises one or more processors (CPUs), input/output ports, network ports, and memories.

A memory may be in the form of a non-permanent memory, a Random Access Memory (RAM), and/or a non-volatile memory, which are computer-readable media including a Read-Only Memory (ROM) or a flash RAM. A memory is an example of a computer-readable medium.

Computer-readable media may be permanent or non-permanent, movable or immovable media, and may implement information storage by any method or technology. Information may be a computer-readable instruction, a data structure, a module of a program, or other data. Examples of storage medium for computers may include, but are not limited to, phase-change memory (PRAM), Static Random-Access Memory (SRAM), Dynamic Random Access Memory (DRAM), any other type of Random-Access Memory (RAM), read-only memory (ROM), Electrically Erasable Programmable Read-Only Memory (EEPROM), Flash memory or any other memory technology, Compact Disc Read-Only Memory (CD-ROM), Digital Versatile Disk (DVD) or any other optical storage, cassette, magnetic tape, magnetic disk, or any other magnetic storage device or any other non-transmission medium, which may be used for storing information that may be accessed by a computing device. According to the definition given herein, computer-readable media do not include any transitory computer-readable media (transitory media), for example, modulated data signals and carriers.

Also noticeably, terms "comprise", "contain", or any variants thereof cover nonexclusive inclusion, so that a process, method, commodity, or device that comprises a series of elements not only includes those elements, but also includes other elements that are not expressly listed, or further includes elements that are inherent in such a process, method, commodity, or device. Without further limitations, for an element limited by the statement "comprises a . . . ", the process, method, commodity, or device may include that element, and another identical element.

One or more embodiments in the specification may be described in the general context of a computer-executable instruction executed by a computer, for example, a program module. Generally, a program module includes a routine, a program, an object, a component, a data structure, etc. for executing a specific task or implementing a specific abstract data type. Alternatively, one or more embodiments in the specification may be implemented in distributed computing environments. In such distributed computing environments, tasks are performed by remote processing devices connected by a communication network. In a distributed computing environment, a program module may be located in a local or remote computer storage medium, including a storage device.

Each embodiment in the specification have been described in a progressive manner, and same or similar components in each embodiment may be referred to each other. The description of each embodiment focuses on its differences from other embodiments. In particular, a system embodiment, which is basically similar to a method embodiment, may be described briefly, and components of the system may be referred to relevant descriptions of the method embodiment.

While one or more embodiments in the specification have been described in detail above, the described embodiments are not intended to limit the specification. It is apparent to those of ordinary skill the art that various alterations and changes may be made to one or more embodiments in the specification. Any modifications, equivalent replacements, improvements, etc. made without departing from the spirit or principle of one or more embodiments in the specification shall fall into the scope defined by the claims of one or more embodiments in the specification.

What is claimed is:

1. A method, comprising:
   instructing a user to move a certificate according to a designated movement method within an imaging region of a camera of a terminal device;
   imaging the certificate in the imaging region to obtain a movement video of the certificate;
   extracting at least one key frame in the movement video;
   analyzing an image content of the at least one key frame according to a certificate identification method that corresponds to the designated movement method to generate an analysis result of the image content, and determining, based on the analysis result, whether the certificate is a forged certificate,
   wherein the designated movement method comprises a front shaking method for moving a front of the certificate back and forth with respect to the camera, and the analyzing an image content of the at least one key frame according to a certificate identification method that corresponds to the designated movement method comprises:
      analyzing the image content of the at least one key frame according to the certificate identification method that corresponds to the front shaking method;
      determining that the at least one key frame is a bright frame imaged in a flash environment or a dark frame imaged in a non-flash environment;
      in response to that the at least one key frame is a bright frame imaged in a flash environment, classifying an image content of the bright frame by a trained first dichotomous classification algorithm to obtain a first classification result, and determining, based on the first classification result, whether the certificate is a forged certificate, wherein the trained first dichotomous classification algorithm is obtained by training based on a light spot characteristic on a plurality of images of first forged certificate samples and a plurality of images of first non-forged certificate samples; and
      in response to that the at least one key frame is a dark frame imaged in a non-flash environment, classifying an image content of the dark frame by a trained second dichotomous classification algorithm to obtain a second classification result, and determining, based on the second classification result, whether the certificate is a forged certificate, wherein the trained second dichotomous classification algorithm is obtained after been trained based on a screen moiré characteristic and/or a certificate rim characteristic on a plurality of images of second forged certificate samples and a plurality of images of second non-forged certificate samples.

2. The method of claim 1, wherein the trained first dichotomous classification algorithm is obtained by:
   imaging fronts of a plurality of first forged certificate samples in a flash environment to obtain the plurality of images of first forged certificate samples, and imaging fronts of a plurality of first non-forged certificate samples in a flash environment to obtain the plurality of images of first non-forged certificate samples;
   identifying a first light spot in each of the plurality of images of first forged certificate samples, and identifying a second light spot in each of the plurality of images of first non-forged certificate samples;
   analyzing characteristics of first light spots to obtain a first light spot characteristic of the plurality of images of first forged certificate samples, and analyzing characteristics of second light spots to obtain a second light spot characteristic of the plurality of images of first non-forged certificate samples; and
   obtaining the trained first dichotomous classification algorithm by machine learning based on the first light spot characteristic and the second light spot characteristic.

3. The method of claim 1, wherein the trained second dichotomous classification algorithm is obtained by:
   imaging fronts of a plurality of second forged certificate samples in a non-flash environment to obtain a plurality of images of second forged certificate samples, and imaging fronts of a plurality of second non-forged certificate samples in a non-flash environment to obtain a plurality of images of second sample non-forged certificate;
   analyzing characteristics of information of the plurality of images of second forged certificate samples to obtain a first image characteristic of the plurality of images of second forged certificate samples, and analyzing characteristics of information of the plurality of images of second sample non-forged certificate to obtain a second image characteristic of the plurality of images of second sample non-forged certificate, wherein the information comprises screen moiré information and/or certificate rim information; and
   obtaining the trained first dichotomous classification algorithm by machine learning based on the first image characteristic and the second image characteristic.

4. The method of claim 1, wherein the analyzing an image content of the at least one key frame according to a certificate identification method that corresponds to the designated movement method, to generate an analysis result of the image content, and determining, based on the analysis result, whether the certificate is a forged certificate comprises:
   identifying in the at least one key frame, by a first image segmentation algorithm, an image region including a human hand that moves the certificate;
   determining, based on the image region, a posture in which the human hand holds the certificate; and
   determining, based on the posture, whether the certificate is a forged certificate.

5. The method of claim 1, wherein the analyzing an image content of the at least one key frame according to a certificate identification method that corresponds to the designated movement method, to generate an analysis result of the image content, and determining, based on the analysis result, whether the certificate is a forged certificate comprises:
   analyzing certificate shaking information of the image content of the at least one key frame, the certificate shaking information comprising at least one of a certificate shaking frequency and a certificate shaking speed; and based on the certificate shaking information, determining whether the certificate is a forged certificate.

6. The method of claim 1, further comprising:
before the analyzing an image content of the at least one key frame according to a certificate identification method that corresponds to the designated movement method:
identifying each angular point or each rim line of the certificate in the at least one key frame;
based on each angular point or each rim line of the certificate, determining whether a front posture of the certificate in the at least one key frame matches a preset standard certificate front posture; and
in response to that the front posture of the certificate in the at least one key frame does not match the preset standard certificate front posture, adjusting the front posture of the certificate in the at least one key frame to the standard certificate front posture.

7. The method of claim 1, wherein
when the designated movement method comprises a flank shaking method for moving the certificate side to side with respect to the camera, the analyzing an image content of the at least one key frame according to a certificate identification method that corresponds to the designated movement method, to generate an analysis result of the image content, and determining, based on the analysis result, whether the certificate is a forged certificate comprises:
analyzing the image content of the at least one key frame according to the certificate identification method that corresponds to the flank shaking method;
identifying in the at least one key frame, by a second image segmentation algorithm, a certificate region including the certificate;
fitting a position of each pixel in the certificate region by a parabolic fitting algorithm to obtain a certificate flank curve;
determining a curvature of the certificate flank curve, and determining whether the curvature of the certificate flank curve is within a preset range; and
in response to determining that the curvature of the certificate flank curve is not within the preset range, determining that the certificate is a forged certificate.

8. The method of claim 7, wherein
the at least one key frame comprises a plurality of key frames; and
the determining whether the curvature of the certificate flank curve is within a preset range, and in response to determining that the curvature of the certificate flank curve is not within the preset range, determining that the certificate is a forged certificate comprises:
determining whether curvatures of a plurality of certificate flank curves are within the preset range; and
in response to determining that a curvature of at least one of the plurality of certificate flank curves is not within the present range, determining that the certificate is a forged certificate.

9. The method of claim 1, wherein the analyzing an image content of the at least one key frame according to a certificate identification method that corresponds to the designated movement method, to generate an analysis result of the image content comprises:
obtaining gyroscopic data of the terminal device;
determining device movement information on the terminal device based on the gyroscopic data, wherein the device movement information comprises at least one of a device movement frequency and a device movement speed; and
in response to that the device movement information meets a preset condition, analyzing the image content of the at least one key frame according to the certificate identification method that corresponds to the designated movement method, wherein the preset condition comprises at least one of that the device movement frequency is smaller than a preset frequency value or that the device movement speed is smaller than a preset speed value.

10. A device, comprising:
a processor; and
a memory, configured to store computer-executable instructions executable by the processor to cause the processor to perform operations including:
instructing a user to move a certificate according to a designated movement method within an imaging region of a camera of a terminal device;
imaging the certificate in the imaging region to obtain a movement video of the certificate;
extracting at least one key frame in the movement video;
analyzing an image content of the at least one key frame according to a certificate identification method that corresponds to the designated movement method to generate an analysis result of the image content, and determining, based on the analysis result, whether the certificate is a forged certificate,
wherein when the designated movement method comprises a front shaking method for moving a front of the certificate back and forth with respect to the camera, the analyzing an image content of the at least one key frame according to a certificate identification method that corresponds to the designated movement method comprises:
analyzing the image content of the at least one key frame according to the certificate identification method that corresponds to the front shaking method;
determining that the at least one key frame is a bright frame imaged in a flash environment or a dark frame imaged in a non-flash environment;
in response to that the at least one key frame is a bright frame imaged in a flash environment, classifying an image content of the bright frame by a trained first dichotomous classification algorithm to obtain a first classification result, and determining, based on the first classification result, whether the certificate is a forged certificate, wherein the trained first dichotomous classification algorithm is obtained by training based on a light spot characteristic on a plurality of images of first forged certificate samples and a plurality of images of first non-forged certificate samples; and
in response to that the at least one key frame is a dark frame imaged in a non-flash environment, classifying an image content of the dark frame by a trained second dichotomous classification algorithm to obtain a second classification result, and determining, based on the second classification result, whether the certificate is a forged certificate, wherein the trained second dichotomous classification algorithm is obtained after been trained based on a screen moiré characteristic and/or a certificate rim characteristic on a plurality of images of second forged certificate samples and a plurality of images of second non-forged certificate samples.

11. The device of claim 10, wherein the analyzing an image content of the at least one key frame according to a certificate identification method that corresponds to the designated movement method, to generate an analysis result of the image content, and determining, based on the analysis result, whether the certificate is a forged certificate comprises:
identifying in the at least one key frame, by a first image segmentation algorithm, an image region including a human hand that moves the certificate;
determining, based on the image region, a posture in which the human hand holds the certificate; and
determining, based on the posture, whether the certificate is a forged certificate.

12. The device of claim 10, wherein the analyzing an image content of the at least one key frame according to a certificate identification method that corresponds to the designated movement method, to generate an analysis result of the image content, and determining, based on the analysis result, whether the certificate is a forged certificate comprises:
analyzing certificate shaking information of the image content of the at least one key frame, the certificate shaking information comprising at least one of a certificate shaking frequency and a certificate shaking speed; and
based on the certificate shaking information, determining whether the certificate is a forged certificate.

13. The device of claim 10, wherein
when the designated movement method comprises a flank shaking method for moving the certificate side to side with respect to the camera, the analyzing an image content of the at least one key frame according to a certificate identification method that corresponds to the designated movement method, to generate an analysis result of the image content, and determining, based on the analysis result, whether the certificate is a forged certificate comprises:
analyzing the image content of the at least one key frame according to the certificate identification method that corresponds to the flank shaking method;
identifying in the at least one key frame, by a second image segmentation algorithm, a certificate region including the certificate;
fitting a position of each pixel in the certificate region by a parabolic fitting algorithm to obtain a certificate flank curve;
determining a curvature of the certificate flank curve, and determining whether the curvature of the certificate flank curve is within a preset range; and
in response to determining that the curvature of the certificate flank curve is not within the preset range, determining that the certificate is a forged certificate.

14. The device of claim 13, wherein
the at least one key frame comprises a plurality of key frames; and
the determining whether the curvature of the certificate flank curve is within a preset range, and in response to determining that the curvature of the certificate flank curve is not within the preset range, determining that the certificate is a forged certificate comprises:
determining whether curvatures of a plurality of certificate flank curves are within the preset range; and
in response to determining that a curvature of at least one of the plurality of certificate flank curves is not within the present range, determining that the certificate is a forged certificate.

15. The device of claim 10, wherein the analyzing an image content of the at least one key frame according to a certificate identification method that corresponds to the designated movement method, to generate an analysis result of the image content comprises:
obtaining gyroscopic data of the terminal device;
determining device movement information on the terminal device based on the gyroscopic data, wherein the device movement information comprises at least one of a device movement frequency and a device movement speed; and
in response to that the device movement information meets a preset condition, analyzing the image content of the at least one key frame according to the certificate identification method that corresponds to the designated movement method, wherein the preset condition comprises at least one of that the device movement frequency is smaller than a preset frequency value or that the device movement speed is smaller than a preset speed value.

16. A non-transitory computer-readable storage medium, storing computer-executable instructions executable by a processor to cause the processor to perform operations including:
instructing a user to move a certificate according to a designated movement method within an imaging region of a camera of a terminal device;
imaging the certificate in the imaging region to obtain a movement video of the certificate;
extracting at least one key frame in the movement video;
analyzing an image content of the at least one key frame according to a certificate identification method that corresponds to the designated movement method to generate an analysis result of the image content, and determining, based on the analysis result, whether the certificate is a forged certificate,
wherein when the designated movement method comprises a front shaking method for moving a front of the certificate back and forth with respect to the camera, the analyzing an image content of the at least one key frame according to a certificate identification method that corresponds to the designated movement method comprises:
analyzing the image content of the at least one key frame according to the certificate identification method that corresponds to the front shaking method;
determining that the at least one key frame is a bright frame imaged in a flash environment or a dark frame imaged in a non-flash environment;
in response to that the at least one key frame is a bright frame imaged in a flash environment, classifying an image content of the bright frame by a trained first dichotomous classification algorithm to obtain a first classification result, and determining, based on the first classification result, whether the certificate is a forged certificate, wherein the trained first dichotomous classification algorithm is obtained by training based on a light spot characteristic on a plurality of images of first forged certificate samples and a plurality of images of first non-forged certificate samples; and in response to that the at least one key frame is a dark frame imaged in a non-flash environment, classifying an image content of the dark frame by a trained second dichotomous classification algorithm to obtain a second classification result, and determining, based on the second classification result, whether the certificate is a forged certificate, wherein the trained second dichotomous classification algorithm is obtained after been trained based on a screen moiré characteristic and/or a certificate rim characteristic on a plurality of images of second forged certificate samples and a plurality of images of second non-forged certificate samples.

17. The non-transitory computer-readable storage medium of claim 16, wherein
when the designated movement method comprises a flank shaking method for moving the certificate side to side with respect to the camera, the analyzing an image content of the at least one key frame according to a certificate identification method that corresponds to the designated movement method, to generate an analysis result of the image content, and determining, based on the analysis result, whether the certificate is a forged certificate comprises:
analyzing the image content of the at least one key frame according to the certificate identification method that corresponds to the flank shaking method;
identifying in the at least one key frame, by a second image segmentation algorithm, a certificate region including the certificate;
fitting a position of each pixel in the certificate region by a parabolic fitting algorithm to obtain a certificate flank curve;
determining a curvature of the certificate flank curve, and determining whether the curvature of the certificate flank curve is within a preset range; and
in response to determining that the curvature of the certificate flank curve is not within the preset range, determining that the certificate is a forged certificate.

18. The non-transitory computer-readable storage medium of claim 16, wherein the analyzing an image content of the at least one key frame according to a certificate identification method that corresponds to the designated movement method, to generate an analysis result of the image content, and determining, based on the analysis result, whether the certificate is a forged certificate comprises:
identifying in the at least one key frame, by a first image segmentation algorithm, an image region including a human hand that moves the certificate;
determining, based on the image region, a posture in which the human hand holds the certificate; and
determining, based on the posture, whether the certificate is a forged certificate.

19. The non-transitory computer-readable storage medium of claim 16, wherein the analyzing an image content of the at least one key frame according to a certificate identification method that corresponds to the designated movement method, to generate an analysis result of the image content, and determining, based on the analysis result, whether the certificate is a forged certificate comprises:
analyzing certificate shaking information of the image content of the at least one key frame, the certificate shaking information comprising at least one of a certificate shaking frequency and a certificate shaking speed; and
based on the certificate shaking information, determining whether the certificate is a forged certificate.

20. The non-transitory computer-readable storage medium of claim 16, wherein the analyzing an image content of the at least one key frame according to a certificate identification method that corresponds to the designated movement method, to generate an analysis result of the image content comprises:
obtaining gyroscopic data of the terminal device;
determining device movement information on the terminal device based on the gyroscopic data, wherein the device movement information comprises at least one of a device movement frequency and a device movement speed; and
in response to that the device movement information meets a preset condition, analyzing the image content of the at least one key frame according to the certificate identification method that corresponds to the designated movement method, wherein the preset condition comprises at least one of that the device movement frequency is smaller than a preset frequency value or that the device movement speed is smaller than a preset speed value.

* * * * *